Sept. 24, 1929.  C. PEARSON  1,729,084
TRACTOR SWEEP RAKE
Filed Feb. 19, 1927    7 Sheets-Sheet 6
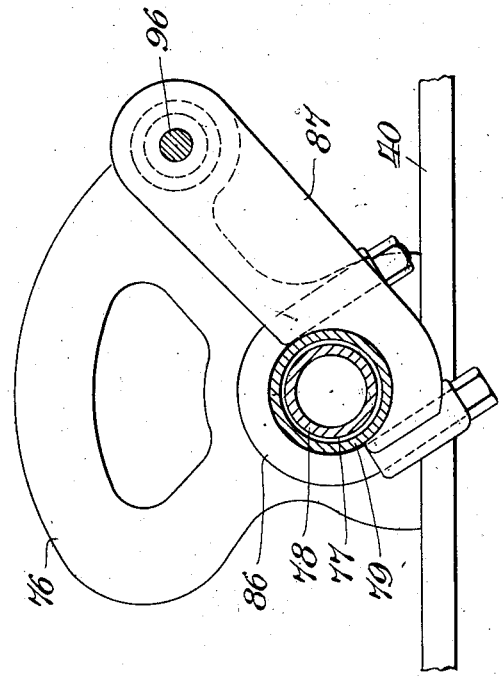
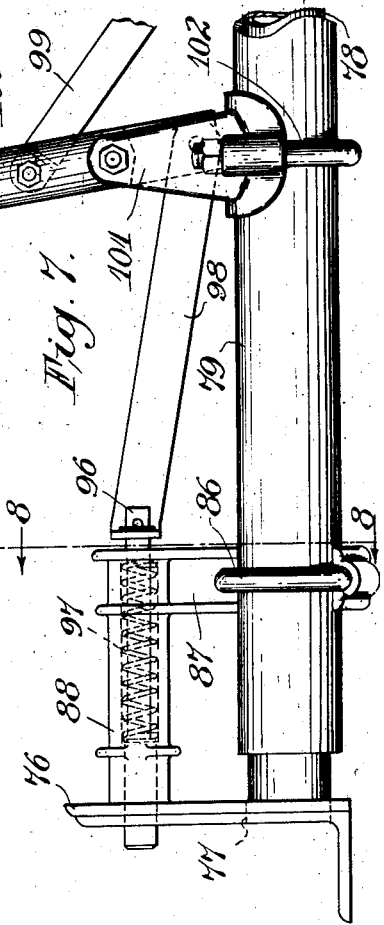
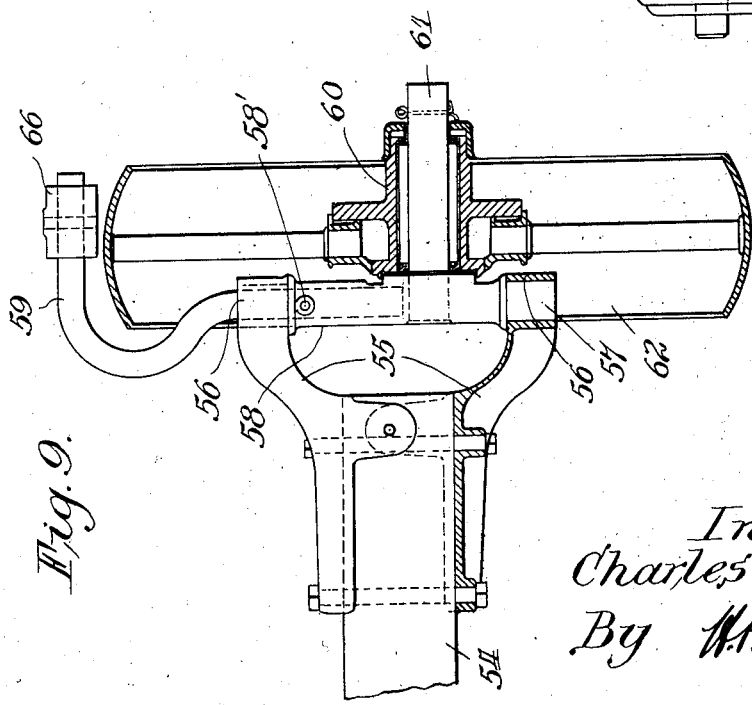
Inventor.
Charles Pearson,
By W.P. Doolittle
Atty.

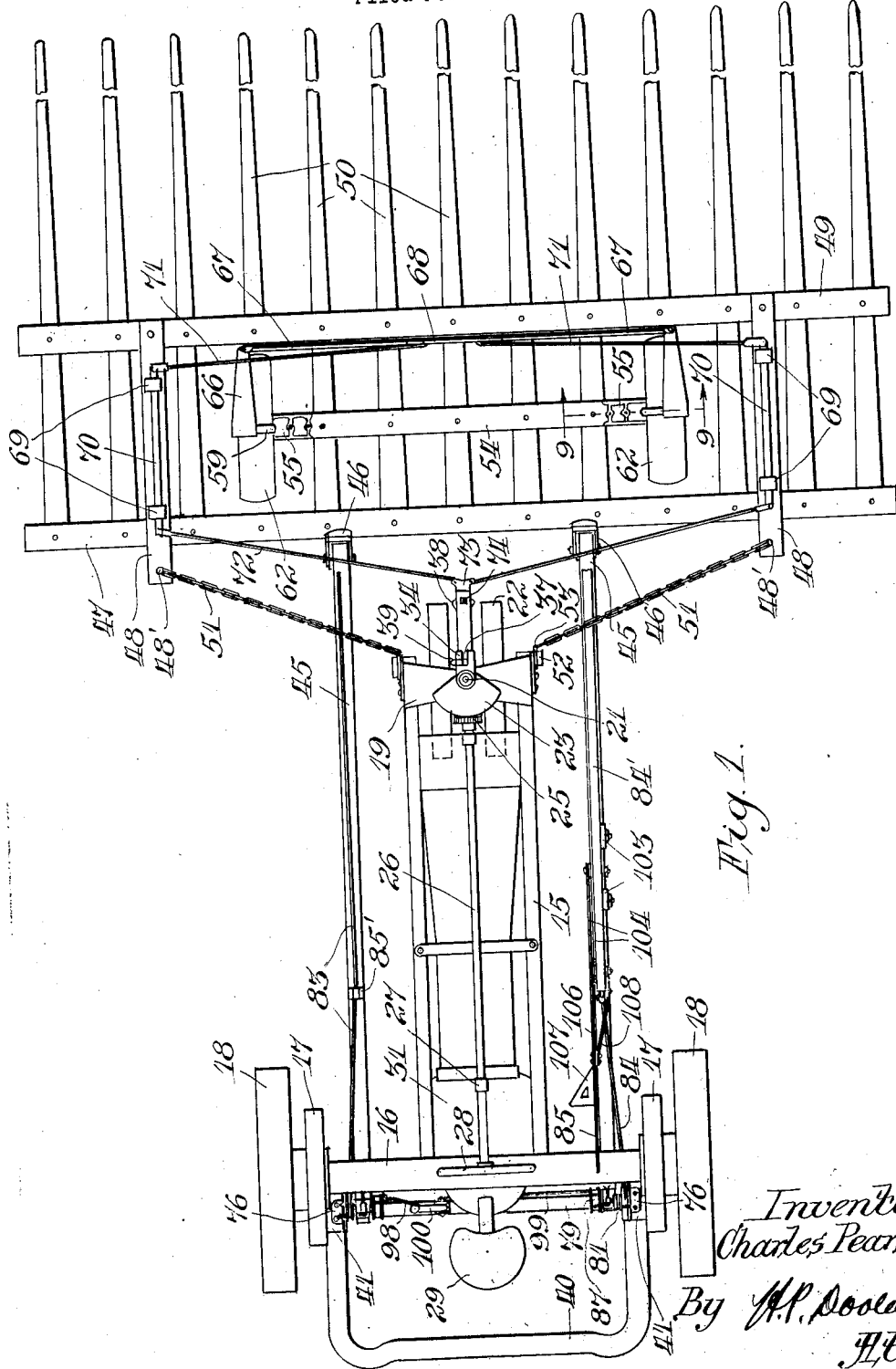

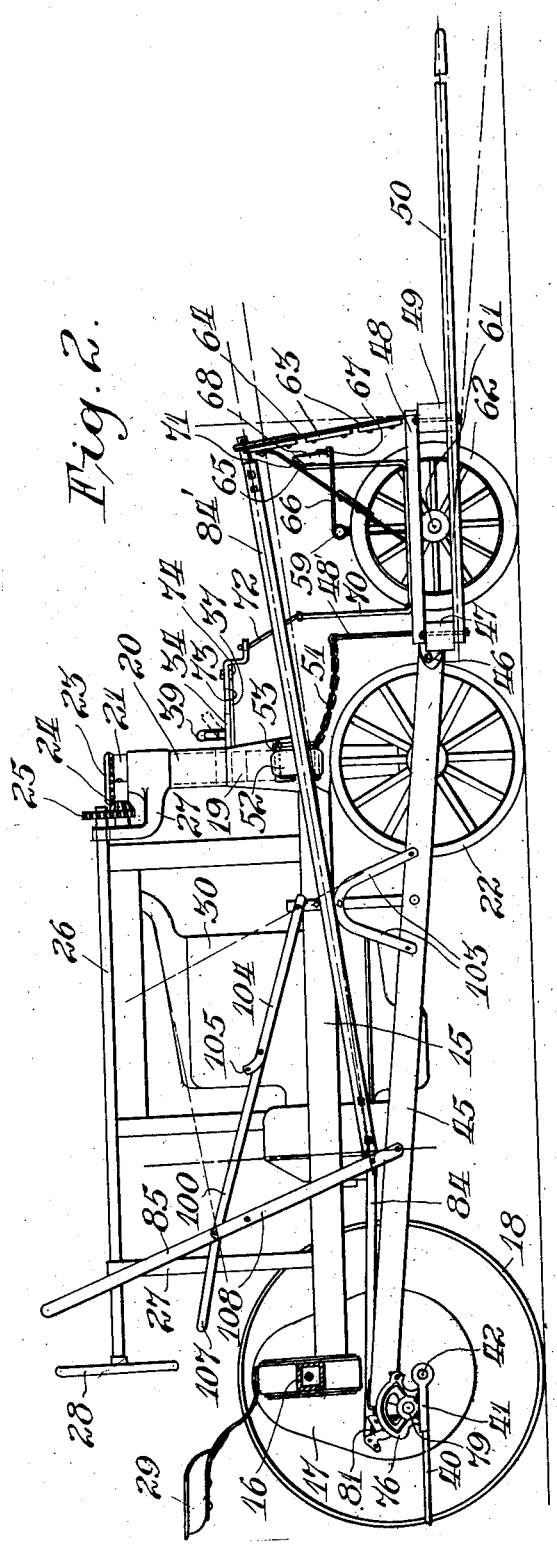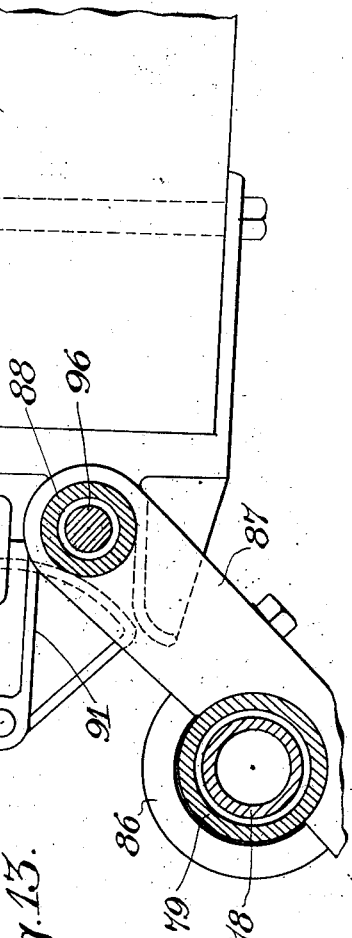
Inventor.
Charles Pearson,
By H.P. Doolittle
Atty.

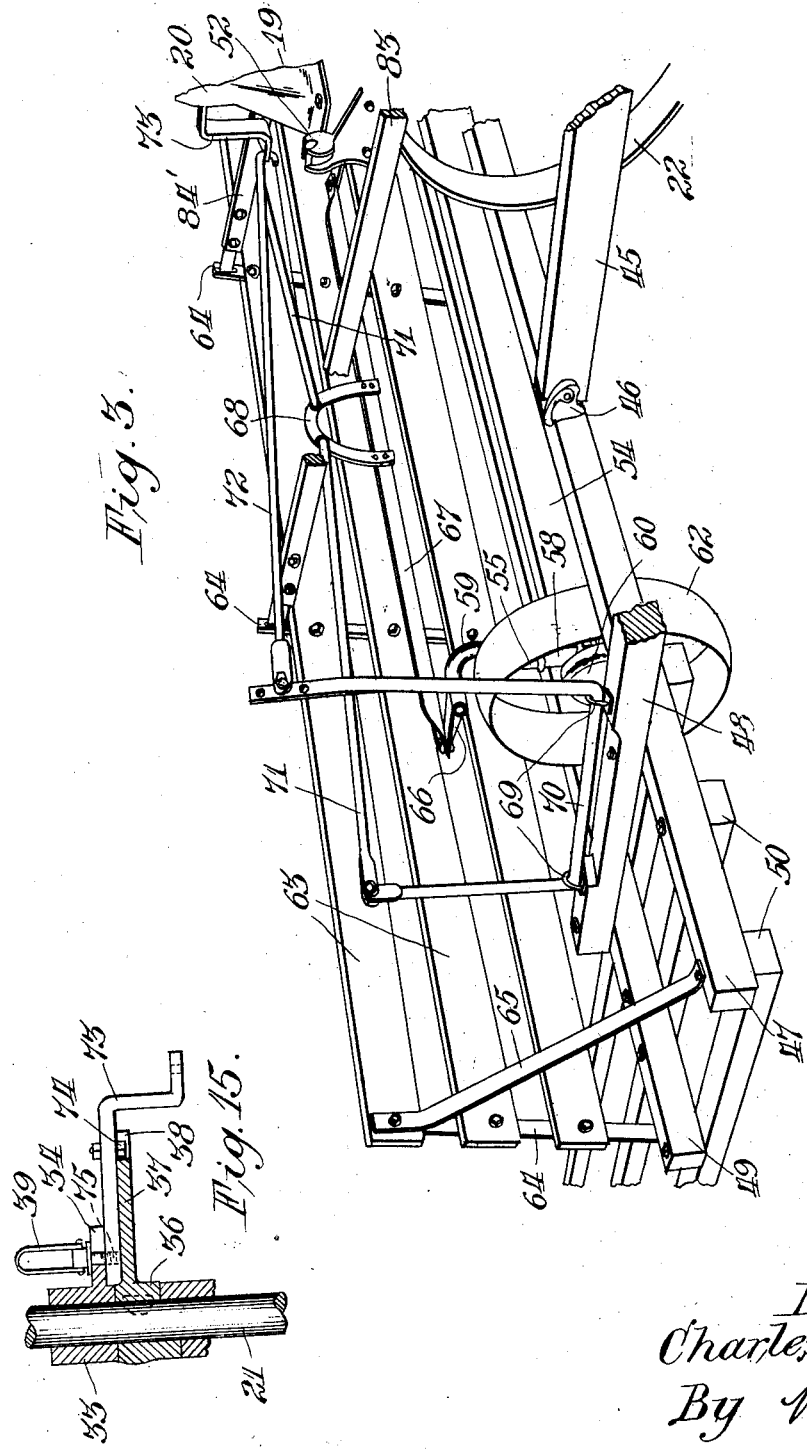

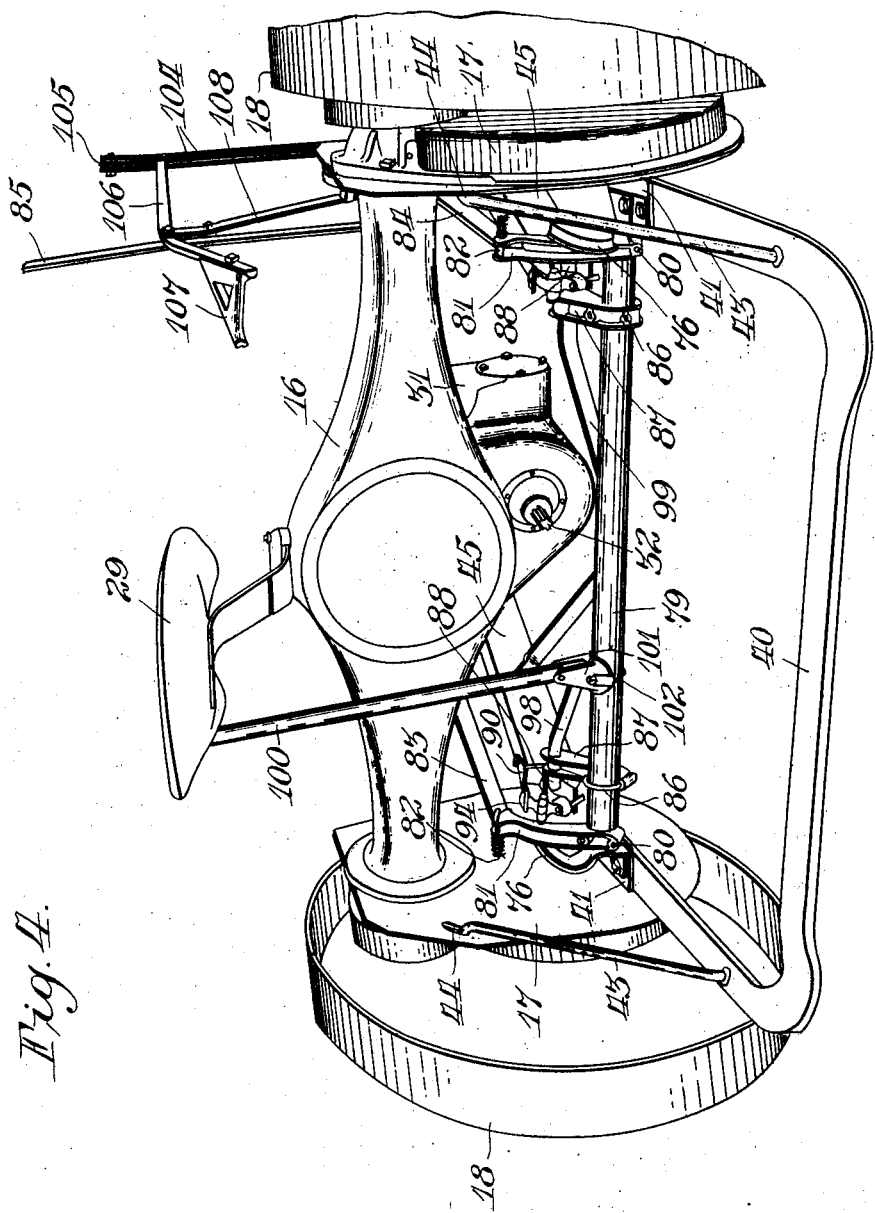

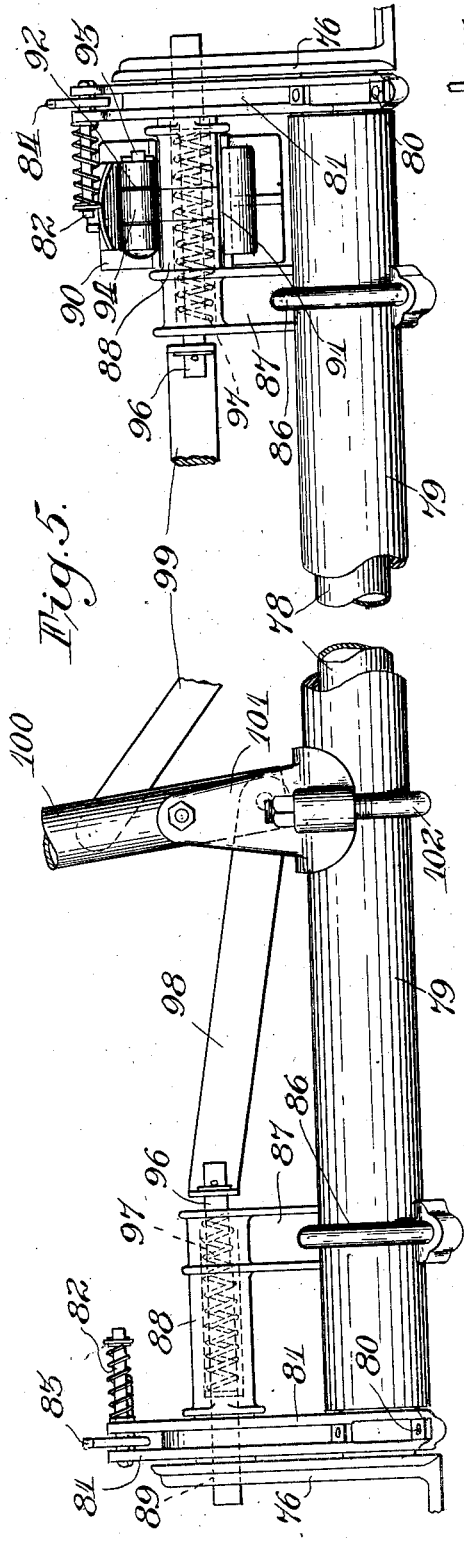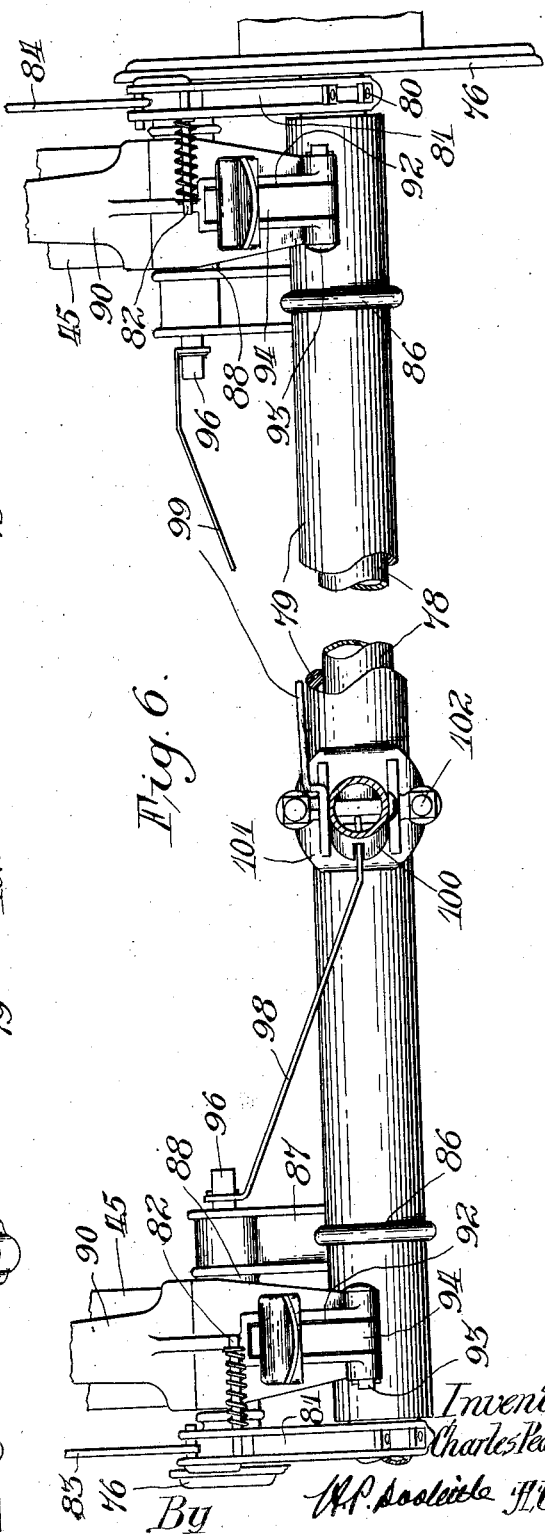

Sept. 24, 1929.  C. PEARSON  1,729,084
TRACTOR SWEEP RAKE
Filed Feb. 19, 1927  7 Sheets-Sheet 7
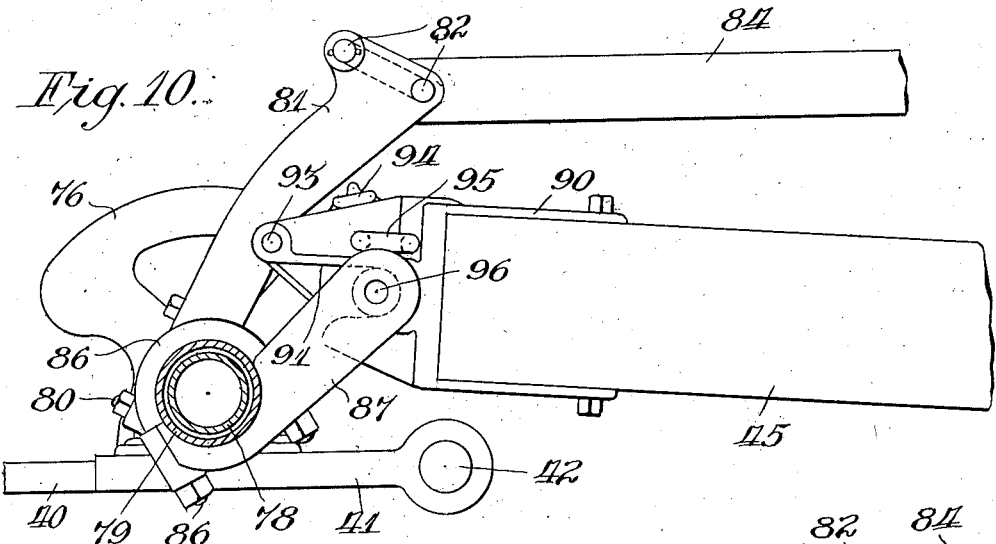
Fig. 10.
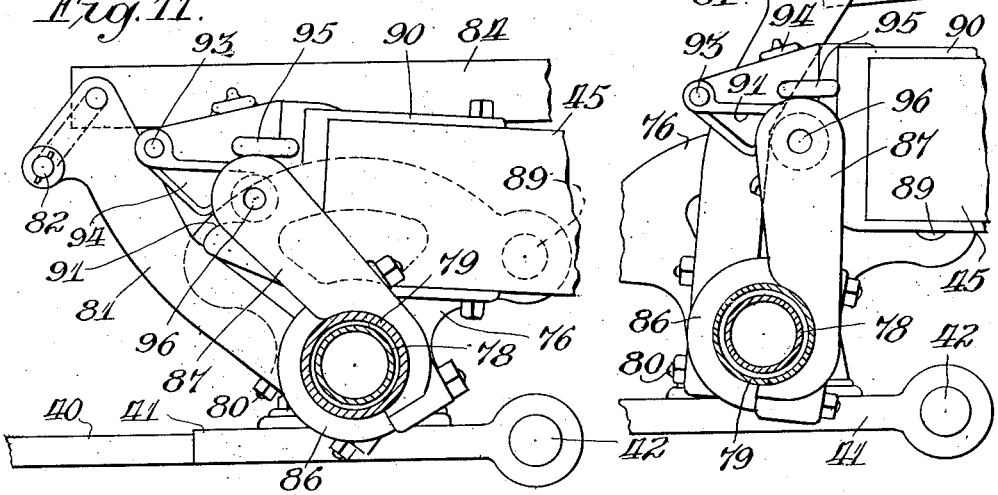
Fig. 11.
Fig. 12.
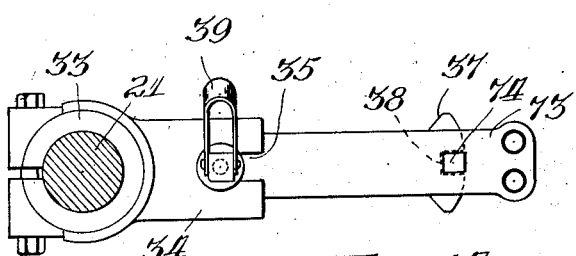
Fig. 14.
Inventor.
Charles Pearson,
By ⟨signature⟩
Atty.

Patented Sept. 24, 1929

1,729,084

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

TRACTOR SWEEP RAKE

Application filed February 19, 1927. Serial No. 169,459.

This invention relates generally to hay harvesting machines and specifically to a machine of the sweep rake type, for use in sweeping or gathering windrows and cocks of hay in a field and transporting such loads, usually to a stacking machine for building the hay into a field storage stack.

Such machines are usually operated by draft animals. Recently, the tendency has been to construct these machines in such a manner as to adapt them for use as an attachment for, or in combination with tractors; thus substituting motive power for animal power in their operation. The machine of the present invention is of this tractor operated type.

The objects of this invention are to provide a sweep rake attachment for tractors which may be easily attached to and detached from a tractor, with a minimum of labor; to provide such a machine in which the rake head is supported on steerable wheels; which are connected with the steering means of the tractor in such a manner that the tractor and sweep rake are steered conjointly; to provide a novel and efficient adjusting mechanism, which will permit the rake teeth yieldingly or floatingly to contact the ground during the raking operation; to provide a manually operable adjusting means for raising the rake head; to provide lifting means for the rake head which is actuated by the movement of the tractor; and, lastly, to provide a tractor sweep rake, which is practicable and has simple and efficient means of control.

Other objects will make themselves apparent to those skilled in this art as the description of the machine continues.

Briefly considered, the improved machine of this invention comprises a frame, the rear end of which is adapted for easy attachment to, and detachment from the rear axle structure of a tractor, said frame extending forwardly alongside the tractor, and pivotally carrying at the front end thereof, forwardly of the tractor, a rake head supported on a pair of spaced, steerable wheels. It will thus be seen that the rake is pushed by the tractor. The steering means of the tractor is articulated with these rake supporting wheels, so that the tractor and rake may be steered together by the operator from a single control on the tractor. Novel, detachable connections are also provided for connecting the forward part of the rake to the forward part of the tractor. A novel manually operable lever mechanism is carried on the rake frame in a position accessible to an operator on the seat of the tractor, for adjusting the rake head. Means is also provided to permit this adjustment to be power effected by the movement of the tractor, independently of the manually actuated adjusting control means. These control connections are so constructed that the raking platform may floatingly ride the ground when gathering or sweeping hay.

Referring to the accompanying sheets of drawings illustrating one embodiment which this invention may assume in practice, it will be seen that—

Figure 1 is a top plan view of the sweep rake of this invention attached to a tractor, the steering and various adjusting controls being generally shown;

Figure 2 is a side elevational view of the sweep rake attached to the tractor;

Figure 3 is a rear perspective view of the rake head, showing the articulated connection from the tractor steering means to the rake steering means;

Figure 4 is a rear perspective view, showing the frame mounting at the rear of the tractor and the control mechanism for permitting power adjustment of the rake head;

Figure 5 is a rear elevational view, partly in section, the left hand end being incomplete for the sake of clearness, showing the means for connecting the rake frame to the rear of the tractor, and the control means for permitting power adjustment of the rake head;

Figure 6 is a top plan view, partly in section, of the same mechanism shown in Figure 5, the left hand end, however, being completed;

Figure 7 is a view similar to Figure 5, showing the structure with certain parts left out for the sake of clearness;

Figure 8 is a sectional view of a detail, as seen along the line 8—8 of Figure 7, viewed in the direction of the arrows;

Figure 9 is a detail, rear elevational, view of one of the rake head supporting and steering wheels, as seen along the line 9—9 of Figure 1, when viewed in the direction of the arrows;

Figure 10 is a side elevational, detail view, showing the extreme forward position the parts of Figures 5 and 6 assume, when the rake head is in its ground engaging position;

Figure 11 is a view similar to Figure 10, but showing these parts in the extreme rearward positions they assume, when the rake head is raised above the ground;

Figure 12 is a similar view, but showing these parts in the intermediate position they assume when the head is being lifted;

Figure 13 is a side elevational, detail view, partly in section, showing the means for detachably connecting the main frame members of the rake to the rear of the tractor; and Figures 14 and 15 are, respectively, plan and side detail views of the steering structure on the tractor, to which the steering means for the sweep rake is detachably connected.

The tractor, with which the sweep rake of this invention is herein associated, comprises a longitudinally disposed, narrow main frame 15, the rear end of which is mounted on an arched rear axle structure (see Figures 1, 2 and 4) embodying a transverse housing and support 16, and depending end housings 17. The housing 16 encloses a differential transmission mechanism and the housings 17 enclose gearing for operating stub axles, not shown, which are carried in and drive the rear traction wheels 18. The forward end of the frame 15 is connected to a transverse bolster 19, (see Figures 1, 2 and 3), which bolster centrally carries an upright housing 20, in which is journaled for rotation, a vertical steering spindle 21, said spindle extending downwardly through the bolster. Beneath the frame 15, the spindle is connected to a front tractor supporting and steering wheel truck 22.

As seen in Figure 2, the upper end of the spindle 21 has fast thereon a quadrantal gear 23, meshing with a pinion 24, turned by a gear 25, fixed on a shaft 26, supported in suitable bearings above the tractor frame, on supports 27. The rear end of this longitudinally disposed shaft 26 is provided with a steering control hand wheel 28, adjacent the operator's station on a seat 29, carried on the transverse housing 16. The tractor frame carries an engine 30 and a transmission housing 31, from which rearwardly protrudes beneath the frame, a longitudinally disposed power take-off shaft 32, (see Figure 4).

Looking at Figures 1, 3, 14 and 15, it will be seen that the vertical steering spindle 21 of the tractor carries loosely thereon, a sleeve 33 formed with an arm 34, said arm having a central slot 35, as shown. Adjacent the sleeve 33, the spindle carries fast thereon, by means of a key, a second sleeve 36, which is formed with a second arm 37, substantially longer than the first arm 34, as shown, the two arms being slightly spaced apart. This arm 37 has a slot 38 formed in its free end. In the slot 35 of the arm 34 is placed a threaded bolt having a tightening member 39, which bolt, as shown in Figure 15, extends flush with the top side of the lower arm 37. For a more complete description of this structure, attention is directed to the prior patent to Benjamin et al. No. 1,539,108 of May 26, 1925. The purpose and function of the structure just briefly described will later be made apparent.

The rear end of the tractor, (see Figures 1, 2 and 4), is provided with a U-shaped draft bar 40, each leg of which is bolted to a bracket 41, the brackets in turn being pivotally connected at 42 to the lower ends of the depending housings 17. Adjustable hangers 43 connect the bar 40 to the upper ends of the housings 17, as shown at 44. This draft bar forms an important part of the rear axle structure, as it functions as a cross brace to strengthen the lower ends of the housings 17.

The main frame and rake head of the sweep rake attachment will next be described, (see Figures 1, 2 and 3). The main rake frame comprises a pair of side members 45, which are adapted to be arranged longitudinally on opposite sides of the tractor. These members are supported by and connected to the rear end of the tractor in a manner subsequently to be described. These members, when in working position, extend slightly forwardly of the transverse plane in which the front end of the wheel truck 22 lies, as seen in Figure 1, where they are pivotally connected to brackets 46, rigidly connected to a transverse, rear rake head bar 47. This bar is of considerable length and extends a substantial distance beyond each side of the tractor, as shown. This bar 47 carries adjacent each end a forwardly and longitudinally extending bar 48, each of which is rigidly connected to a second transverse rake head bar 49. Connected to each of the transverse rake head bars, at spaced intervals, are the usual raking tines 50, which extend forwardly, as shown, a substantial distance. It is here to be noted that the bars 48 extend rearwardly a short distance back of the first rake head bar 47. The rear free ends of these bars 48 carry upright rods 48', each of which receives at its upper end one end of a chain 51, the other ends of the chains being adapted for detachable connection to implement coupling brackets 52 at the ends of the front tractor bolster. These brackets are formed as in the patent heretofore mentioned with upper and lower sockets which in this case receive a detachable clamping attaching means 53, to which the chains are fastened. The purpose of these chains will later appear.

Looking at Figures 1, 3, and particularly Figure 9, it can be seen that a relatively short transverse bar 54 is arranged on the head between the bars 47 and 49. The center teeth 50 are also bolted to this bar, as shown. The ends of the bar 54 have bolted thereto bifurcated brackets 55, which are formed with vertically alined sockets 56, which receive extensions 57 of a bearing 58, said bearing being hollow at its upper end to receive a cranked spindle 59. The bearing 58 is pinned at 58' to the spindle 59, so that the two elements may turn together. Extending into the bearing 58 below the spindle 59 and through a journal box 60 connected to the bearing 58, is a stub shaft 61 on which is carried a supporting wheel 62. It is to be kept in mind that there are two of these wheels for supporting the rake head and that each of them is identically mounted and connected to the frame bar 54. Furthermore, these wheels are disposed outside of the longitudinal members 45.

The rake head also includes the usual back member comprising spaced slats 63 bolted to spaced uprights 64, which in turn are secured to the forward transverse bar 49 and braced by braces 65 secured to the rearward transverse bar 47. (See Figures 2 and 3).

The connection of the supporting wheels 62 to the steering means of the tractor will next be described. See Figures 1, 2 and 3. The spindles 59 of the rake head wheels 62 are provided with rigidly connected, forwardly extending arms 66, which are tied together at their front ends by a rigid, transverse tie rod 67. Centrally secured to this tie rod is an arch or bail 68. Each frame bar 48 is provided with bearings 69 in which is rockably carried an upright U-shaped cranked control member 70, the forward arm of each being pivotally connected by links 71 to the bail 68. The rearward arms of these U-shaped cranks are connected by links 72 to a center bar 73. See also Figures 14 and 15. This center bar carries a headed bolt 74, its shank fitting the slot 38 in the arm 37, which, it will be remembered, swings upon turning movement of the tractor steering spindle 21. The center bar 73, it is to be seen, is sandwiched between the two arms 37 and 34. A hole 75 is formed in the center bar 73, said hole receiving the bolt of the securing member 39. In this fashion the center bar 73 is detachably connected to the arms 34 and 37.

From so much of the description it is clear now that the rake head is self-supported by means of the wheels 62 and that these wheels are articulated with the steering spindle 21 of the tractor, and, lastly, that the rake head is also detachably connected, by means of the chains 51, to the front bolster 19 of the tractor.

The rear end connection of the sweep rake to the tractor will next be described. See Figures 1, 2, 4, 5, 6, 7, 8, 10, 11, 12 and 13. As shown in these drawings, each bracket 41 of the draft bar 40 has bolted thereto, the flange of an upright casting 76, the upper end of which is arcuate in shape. Each of these castings has a hole 77 centrally formed therein, which holes function as bearings for a transverse rock pipe or shaft 78. See Figures 7 and 8. Encircling this shaft is a second pipe shaft 79, the ends of which stop short of the casting 76, for the purpose of permitting room for the securement, by means of U-bolts 80, of upwardly extending arms 81. The upper free ends of these arms are bifurcated to receive, detachably, by means of spring lock bolts 82, forwardly extending adjusting members 83 and 84, the member 83 being pivotally connected to one of the uprights for the backboard of the rake head, (see Figure 3), said member 83 comprising, as shown in Figure 1, a rear link corresponding with the link 84 on the opposite side of the machine, and a front link corresponding with the link 84' also on the opposite side of the machine, said connection 83 having its constituent parts carried on a short lever 85' pivoted on the left hand frame member 45, and the other member 84 being pivotally connected to a hand lever 85 fulcrumed on the side frame member 45 (see Figure 2).

Slightly spaced inwardly from the arms 81, the pipe shaft 79 has secured thereto by U-bolts 86, a pair of relatively shorter arms 87, which arms have integrally formed therewith, lateral, bored-out extensions 88, which abut, but are not connected to, the arcuate side castings 76. The upper forward end of each of these castings 76 is formed with a hole 89 for a purpose presently to appear. The extensions 88 form a bearing to which the side frames 45 of the rake are pivotally connected, as will now be described.

The rear end of each side frame 45 (see Figures 10, 11, 12 and 13) has bolted thereto a casting 90, having a U-shaped socket 91, which is centrally and vertically slotted at 92. (See Figure 6.) The rear, upper end of each of these castings carries a pivot pin 93, to which is pivotally connected, a latch 94. It can now be seen that the U-shaped sockets 91 receive the extensions 88, and that the latch 94 securely holds these parts against disconnection. A spring bolt 95 may be passed through the casting 90 and latch 94 to prevent accidental release of the latch.

Slidably arranged in each extension 88 is a bolt 96 which is normally held locked in the hole 89 in the casting 76, by means of a spring 97. Connected to these bolts are transversely extending links 98 and 99, said links in turn being connected to a trip lever 100 pivoted in a bracket 101 centrally made fast on the pipe shaft 79 by means of a U-bolt 102. The link 99 is downwardly bowed, as shown, so as not to cause interference with utilization of the power take-off shaft 32 of the tractor.

As has already been mentioned, the right hand frame bar 45 pivotally carries a hand lever to which is connected the adjusting member 84. Extending forwardly of this lever is a continuation 84' of the member 84, said continuing portion being connected to one of the right hand backboard supports 64 (see Figures 2 and 3). Forwardly of the lever 85 the frame member 45 carries a tripod support 103, to the upper end of which is pivotally connected a double arm 104 having a stop 105, there being another arm 106 pivoted in the arm 104 and to the hand lever 85. These two arms 104 and 106 thus form a toggle link. The arm 106 is extended rearwardly to terminate in a foot engaging treadle 107. (See Figure 4.) The hand lever 85 and arm 106 are additionally supported by a link 108 connected with the lever 85, as shown, and the frame 45.

From this detailed description it is now seen that the rake head is pivotally connected to the frame bars 45 at 46, and, as a result, said rake head may rock and be rocked on the axis of its supporting wheels 62. Furthermore, it should be kept in mind that these frame members 45 are connected to the short arms 87 fast on the outer pipe shaft 79 to rock therewith; and, that the adjusting links 83, 84, 84', are connected to the rake head backboard and to the long arms 81 fast on the inner pipe shaft 78 to rock therewith.

The use and operation of the sweep rake of this invention will now be described. First, it is necessary to attach the sweep rake to the tractor. The tractor will be run between the side frames 45, the rear ends of which will be detachably connected to the extensions 88 by means of the latch 94 and spring bolt 95. It is to be understood that the shaft structure 78, 79, their arms 81, 87, and lever 100, with castings 76 may remain on the tractor rear axle structure independently of the sweep rake attachment. Next, the adjusting members 83 and 84 will be connected, detachably, to the arms 81 by means of the spring bolts 82. The links 72 are then picked up with the center piece 73, which latter member is detachably secured to the arms 34 and 37 of the vertical steering spindle 21 of the tractor, as has been described. Lastly, the chains 51 are detachably secured to the brackets 52 of the tractor bolster 19. The sweep rake attachment has now been associated with the tractor in position for operation.

Let us assume that the sweep rake is in position to sweep a windrow. The rake teeth will be in ground engaging position, as indicated in the dash lines in Figure 2. The lever 85 will be swung forwardly and the toggle 104, 106 will be broken, as indicated.

The disposition of the rear end parts is generally shown in Figure 4 and the positions of the long arms 81 and the adjusting members 83 and 84 connected thereto, and to the rake head backboard, are shown in detail in Figure 10. Similarly is shown the position of the short arms 87 and the side members 45 in the same figure. It is to be recalled that the arms 81 are mounted on the inner pipe shaft 78. In the down position of the rake head, the spring bolts 96 engage the holes 89 in the castings 76, and, as a result, the side frames 45 are locked against movement with their connected outer pipe shaft 79. It can readily be seen now that, as the tractor pushes the sweep rake, the teeth, and, in fact, the entire rake head, may floatingly bob up and down in accordance with ground irregularities. The rake head will rock about the axis of the supporting wheels 62, such action being permitted by the pivot points 46. During this floating action of the rake head, the toggle 106, 104 will jack-knife freely. A considerable range of float for the rake head is allowed because the arms 81 are substantially spaced rearwardly of the extensions 88 in the locked position of the bolts 96, which spacing allows the rake head to drop below a normal level, and, of course, the rake head may float upwardly a substantial distance, because the arms 81 may swing rearwardly without interruption to their limit of movement as generally controlled by the interlinked arrangement of the parts. While the load is being gathered, the operator on his seat 29 of the tractor may exert foot pressure on the treadle 107 to exert a force which will move the lever 85 to move the adjusting members 83, 84', in a manner to press the rake teeth to duty on the ground. Such pressure will be equally applied to the rake head at spaced points, one on each rear side thereof, as will be understood, and, as a result, no twist can result in the head, and all teeth will equally press the ground.

Of course, as the tractor and rake traverse the field, it becomes necessary to steer these implements. Turning of the hand wheel 28 by the operator on the tractor will operate the gearing 25, 24 and 23, to turn the spindle 21 to angle the wheel truck 22 of the tractor. The spindle 21 will also turn the arm 37 and center piece 73, which will pull on one or the other of the links 72 to rock one of the U-shaped control cranks 70, which in turn will act on the arch 68 to move laterally the tie rod 67, for the purpose of angling the rake head supporting wheels 62, as will be understood. The chains 51, which on the straightaway hang loosely, prevent excessive side sway of the rake head on turns, which might result from the rear connection of the frames 45 to the back of the tractor. Positioning of the steering control members 70 laterally outside of the wheels 62 also is advantageous, as the steering control forces are better exerted when turns are made, and act efficiently in spite of any tendency toward side sway of the rake head. Thus, an operator need concern himself only with the steering of the tractor, as the sweep rake, through the connections described, is steered automatically. Furthermore, no binding can take place in the steering connections due to any differential movement between the tractor and rake due to rake resistance, because of the fact that the controls 70 are so far to the outside and any tendency to lengthening or shortening of the steering connections because of such tendency is effectively compensated for by the length of the links 72.

We will now assume that a load has been gathered and it becomes necessary to elevate or raise the rake head, so that the load may be transported clear of the ground to a barn or to a stacking machine. Depending upon circumstances, the operator has his choice of any one of several means at his disposal for raising the rake head, to-wit, manually controlled means; means controlled by the forward movement of the tractor, which we may call power actuated means; and, lastly, a conjoint action of manual and power controlled means.

The manual means will first be described. The operator in his seat 29 moves the hand lever 85 rearwardly and, as a result, pulls the adjusting members 83, 84, 84', to the rear, with the arms 81, which act on the rake head backboard to tilt or raise the rake head on the axis of the supporting wheels 62. After the lever 85 has been swung back a predetermined distance, the toggle 104, 106 will lock and retain the parts described in their adjusted positions. The load thus raised permits operation of the tractor for transporting the load to the stacking machine.

For making this step of the sweeping operation easier, it is preferable to utilize the forward motion of the tractor, plus the resistance of the load, for effecting a lift of the rake head, thereby making this operation automatic without any expenditure of physical energy on the operator's part. In this step, the tractor is kept in motion with the load gathered on the rake head, which is still in ground contacting position. The operator, with his foot, kicks the trip lever 100 laterally, which releases the spring bolts 96 from the holes 89 in the castings 76. As a result, there is possible a relative or differential movement between the rake and the tractor, the latter traveling ahead, and the former in effect, momentarily standing still, because the rake head is in engagement with the ground. Thus, both pipe shafts 78 and 79 and the arms 81, 87, carried thereby rock rearwardly from the position shown in Figure 10 to that shown in Figure 11. This action specifically is as follows: The movement starts from the showing in Figure 10, with the arms 81, 87, in extreme forward position. The members 45 move back, pushing the arms 87 rearwardly. The members 83, 84 push the arms 81 rearwardly, but slower than the arms 87, in such a manner that the extensions 88 of the arms 87 catch up with the arms 81, as shown in Figure 12. Thus, the extensions 88 pick up the arms 81 and accelerate their rearward movement to complete the lift of the rake head to the final extreme position shown in Figure 11. This lifting force is equally applied to the spaced points at 46 on the rake head, resulting in an even lift thereof without developing torque. It now is clear that the load is raised by a utilization of the action between the force of forward movement of the tractor and the force of resistance offered by the load. Thus, the rake head is raised to the full line position of the parts shown in Figure 2, with the toggle 104, 106, again locking the parts in adjusted position.

When the load has been transported to the stacker, the foot treadle 107 is used to break the toggle, whereupon the rake head falls by gravity to the ground, and then, by a backing movement of the tractor, the load may be dumped onto the ground, or may be transferred to the stacker in the customary manner. The bolts 96, as a result of this backing movement, again become locked automatically, and the outfit is once more ready for sweeping without further manipulation.

Of course, obviously, the hand lever 85 may be conjointly employed with the power lift, if desired to raise the load.

When the hay rake has been detached, the parts comprising the double pipe shaft rear control and connections may remain in place on the rear axle structure, as has been stated. A mower may then be coupled to the draft bar 40 and be driven from the power take-off shaft 32, this being permitted by the bow in the link 99.

From the above detailed disclosure it must now be appreciated that this invention achieves all of the desirable objects heretofore recited, and that the same is simple, yet dependable in action, with no great likelihood that anything will get out of order.

It is the intention to cover all such changes and modifications which do not depart from the spirit and scope of this invention, as is indicated in the subjoined claims.

What is claimed as new is:

1. The combination with a tractor, of an implement, connecting means, said means permitting a differential movement between the tractor and implement, an adjustable element on the implement, and means controlled by said differential movement for adjusting said adjustable element.

2. The combination with a tractor, of a sweep rake, connecting means, said means permitting a differential movement between the tractor and sweep rake, an adjustable rake head included in the sweep rake, and means controlled by said differential movement for adjusting said rake head.

3. The combination with a tractor, of a sweep rake including an adjustable rake head disposed in advance of the tractor, means connecting the sweep rake to the tractor permitting a differential movement between the two, and means operable by such movement for adjusting said rake head.

4. The combination with a tractor having a rear axle structure, of a sweep rake including an adjustable rake head disposed forwardly of the tractor, means connecting the rake head to the rear axle structure, said means permitting a slight relative displacement between the tractor and sweep rake, and means operable by such displacement for adjusting the rake head.

5. The combination with a tractor having a rear axle structure, of a sweep rake including an adjustable rake head disposed forwardly of the tractor, movable means connecting the rake head to the rear axle structure, means normally holding said means against movement, and means for releasing the holding means, whereby a differential movement between the rake and tractor is permitted, said movement acting to adjust the rake head.

6. The combination with a tractor having a rear axle structure, of a sweep rake including an adjustable rake head disposed forwardly of the tractor, a rockable member carried by the rear axle structure, means connecting the rake head to said rockable member, said means permitting a differential movement between the tractor and rake to adjust said rake head.

7. The combination with a tractor, of a sweep rake connected thereto to be pushed thereby, an adjustable rake head included in the sweep rake, and means carried on the tractor for permitting the force of forward movement of the tractor to act against the force of resistance of the rake head to effect automatic adjustment of said head.

8. The combination with a tractor, of a sweep rake connected thereto to be pushed thereby, a wheel supported rake head included in the sweep rake, and means utilizing the resistance of the load on the head upon forward movement of the tractor to raise said head by tilting the same upwardly around the axis of its wheel supports.

9. The combination with a tractor having a rear axle structure, of a sweep rake including an adjustable rake head disposed forwardly of the tractor, rockable members carried by the rear axle structure, and means connecting said members to the rake head, said rockable members being operated by the movement of the tractor to adjust said rake head.

10. The combination with a tractor having a rear axle structure, of a sweep rake including an adjustable rake head disposed forwardly of the tractor, a plurality of rockable members carried by the rear axle structure, and a plurality of rigid connecting members between the rake head and rockable members for adjusting said rake head.

11. The combination with a tractor having a rear axle structure, of a sweep rake including an adjustable rake head disposed forwardly of the tractor, a rockable shaft carried by the rear axle structure, an arm fast on the rockable shaft, a connection from the rake head to said arm, said members being actuated by the movement of the tractor to adjust said rake head.

12. The combination with a tractor having a rear axle structure, of a sweep rake including an adjustable rake head disposed forwardly of the tractor, rockable shafts carried by the rear axle structure, arms fast on the shafts, connections between the arms and rake head, said shafts, arms and connections being operable by the movement of the tractor to adjust said rake head.

13. The combination with a tractor having a rear axle structure, of a sweep rake including an adjustable rake head disposed forwardly of the tractor, a rockable shaft carried by the rear axle structure, an arm fast on the shaft, a connection from the rake head to said arm, means for locking said shaft against rocking movement, and means for releasing said locking means to permit the movement of the tractor to actuate the shaft, arms and connection to adjust the rake head.

14. The combination with a tractor having a rear axle structure, of a sweep rake including an adjustable rake head disposed forwardly of the tractor, rockable shafts carried by the rear axle structure, arms fast on the shafts, connections from the rake head to the arms, means for locking one of said shafts against rocking movement, and means for releasing said means to permit the movement of the tractor to actuate the shafts, arms and connections to adjust the rake head.

15. The combination with a tractor, of a sweep rake connected to the tractor to be pushed thereby, a rake head for the rake, a rock shaft carried by the tractor, and means connecting the shaft and rake head to permit the latter floatingly to contact the ground.

16. The combination with a tractor having a rear axle structure, of a sweep rake connected to the tractor to be pushed thereby, a rake head for the rake, a rock shaft carried by the rear axle structure, and means connecting the shaft and rake head to permit the latter floatingly to contact the ground.

17. The combination with a tractor, of a sweep rake including a rake head carried on wheels, a rockable member carried on the tractor at its rear, said rake connected to said rock member by adjusting members connected at spaced points to the rake head and extending along the sides of the tractor and connected to the rock member for evenly applying pressure or lifting forces to the rake head.

18. The combination with a tractor having rockable means carried thereon at its rear, of a sweep rake having an adjusting member arranged along each side of the tractor and connected to the rockable means, and a wheel supported rake head in front of the tractor and connected to said adjusting members in a manner to permit an even application of force to the rake head in pressing the same on the ground or when lifting the same.

19. The combination with a tractor, of a sweep rake connected to the tractor to be pushed thereby, an adjustable rake head for the rake, a rock shaft carried by the tractor, adjusting means connecting said shaft to the head in a manner to permit the latter floatingly to contact the ground, a second rock shaft carried by the tractor, means connecting said second shaft with the head, means for locking the second shaft, and means for releasing the same to permit movement of the tractor to raise the rake head to adjusted position.

20. The combination with a tractor, of a sweep rake connected to the tractor to be pushed thereby, an adjustable rake head for the rake, a rock shaft carried by the tractor, arms on the shaft, adjusting members connecting the arms and rake head, a second rock shaft, arms thereon, means connecting said arms to the rake head, and means for locking the second shaft against rocking movement to hold the rake head in ground engaging position, said first shaft being freely rockable to permit the rake head floatingly to contact the ground.

21. The combination with a tractor, of a sweep rake comprising frame members, a rake head pivoted to the frame members, a shaft carried rockably on the tractor, connections from the rake head to the rock shaft, and a second rock shaft carried by the tractor, said sweep rake frame members being connected thereto.

22. The combination with a tractor, of a sweep rake comprising frame members, a rake head pivoted to the frame members, a rock shaft carried by the tractor, arms on the shaft, connections from the arms to the rake head, a second rock shaft carried on the tractor, and arms thereon connected to the rake frame members.

23. The combination with a tractor, of a sweep rake comprising frame members, a rake head pivoted to the frame members, a shaft carried by the tractor, arms on the shaft, connections from the rake head detachably connected to the said arms, a second shaft on the tractor, and arms thereon, said rake frame members being detachably connected to said last mentioned arms.

24. The combination with a tractor, of a sweep rake including frame members and a rake head pivoted thereto, means connecting the frame members to the tractor in a manner permitting a differential movement between the tractor and rake to raise the rake head, and means for locking the rake head in its raised position.

25. The combination with a tractor, of a sweep rake adapted to be pushed thereby comprising a frame and a pivoted rake head, means for connecting said frame to the rear of the tractor in a manner permitting a differential movement between the tractor and rake to raise the rake head, and means located on said rake frame for retaining the rake head in its raised position.

26. The combination with a tractor, of a sweep rake adapted to be pushed thereby comprising a frame and a pivoted rake head, a shaft carried at the rear of the tractor, means connecting the rake frame to said shaft, a second shaft carried at the rear of the tractor, connections from said shaft to the rake head, said connections permitting the movement of the tractor to raise the rake head, and a toggle link mechanism on the rake frame for retaining the head in raised position.

27. The combination with a tractor having a front bolster and a rear axle structure, of a sweep rake comprising a frame and pivoted rake head adapted to be pushed by said tractor, means for connecting the frame to the rear axle structure, and flexible means for connecting the rake head to the bolster.

28. The combination with a tractor having a front bolster and a rear axle structure, of a sweep rake comprising a frame and pivoted rake head adapted to be pushed by said tractor, means for detachably connecting the frame to the rear axle structure, and flexible means for detachably connecting opposite sides of the rake head to opposite sides of said bolster.

29. The combination with a tractor having a front bolster and a rear axle structure, of a sweep rake comprising a pair of spaced frame members and a pivoted rake head, said frame members being arranged on opposite sides of the tractor body and detachably connected to said rear axle structure in a manner to permit the tractor to push the rake, and flexible detachable connections from the rake head to the bolster.

30. The combination with a tractor, of a sweep rake comprising a frame and a pivoted rake head, a shaft carried at the rear of the tractor, means connecting said frame to said shaft, and means on said frame connected to adjust the rake head.

31. The combination with a tractor, of a sweep rake comprising a frame and a pivoted rake head, a shaft carried by the tractor, means connecting said shaft to the frame, a second shaft carried by the tractor, and a lever located on said frame and connected to the rake head and second shaft for adjusting the rake head.

32. The combination with a tractor, of a sweep rake comprising a frame and a pivoted rake head, a rock shaft carried by the tractor, an arm on the shaft connected to the frame, a second rock shaft carried by the tractor, an arm on the second shaft, and a hand lever on the frame having connections with the arm on the second shaft and the rake head for adjusting the latter.

33. The combination with a tractor, of a sweep rake comprising a frame and a pivoted rake head, rock shafts carried by the tractor, arms on the shafts, said frame being connected to an arm on one of said shafts, a hand lever on the frame, connections from an arm on another of the shafts to the lever and from the lever to the rake head for adjusting said rake head, and means for locking said lever to hold the rake head in adjusted position.

34. The combination with a tractor having a rear axle structure and a front steering means, of a sweep rake having a wheel supported rake head and a frame connected to the rear axle structure, control members for angling the wheel supports of the rake head, said members being located on the rake head outside said supports, and connections from said control members to the tractor steering means.

35. The combination with a tractor having a steering means, of a sweep rake having a rake head supported on wheels and a frame connected to the tractor to be pushed thereby, means on the rake head outside the wheels for angling said wheels, and means connecting said means to the tractor steering means.

36. The combination with a tractor having a steering means, of a sweep rake having a rake head supported on a pair of spaced wheels, a frame for the rake connected to the tractor to be pushed thereby, rockable control members located on the rake head, and means connecting said members to the wheels and to the tractor steering means.

37. The combination with a tractor having a steering means, of a sweep rake having a rake head supported on a pair of spaced wheels, a frame for the rake connected to the tractor to be pushed thereby, a rockable control member located on the rake head outside of each supporting wheel, means connecting said control members to the supporting wheels, and means connecting said control members to the tractor steering means.

38. The combination with a tractor having a steering means, of a sweep rake having a rake head supported on a pair of spaced wheels, a frame for the rake connected to the tractor to be pushed thereby, U-shaped control members rockably mounted on the rake head, means connecting said control members to the supporting wheels, and means connecting said control members to the tractor steering means.

39. The combination with a tractor having a front vertical steering spindle provided with an arm movable therewith, of an attachment for the tractor comprising a sweep rake having a rake head supported on spaced wheels, and means connecting said wheels to said arm on the steering spindle.

40. The combination with a tractor having a front vertical steering spindle provided with an arm movable therewith, of an attachment for the tractor adapted to be pushed thereby, comprising a sweep rake having a rake head supported on spaced wheels, control members on the rake head for angling said wheels, and means connecting said control means to the arm on the tractor steering spindle.

41. The combination with a tractor having a front vertical steering spindle provided with an arm movable therewith, of an attachment for the tractor adapted to be pushed thereby, comprising a sweep rake having a rake head supported on spaced wheels, control members rockably mounted on said rake head outside the supporting wheels, means connecting said control members to the supporting wheels, and means detachably connecting said control members to the arm on the tractor steering spindle.

42. An attachment for a tractor having a rear axle structure and a front steering spindle carrying an arm extension, said attachment comprising a frame detachably connected to the rear axle structure, a rake head supported on spaced carrying wheels, said rake head being connected to the frame forwardly of the tractor to be pushed thereby, means flexibly connecting the rake head to the front of the tractor, control members on the rake head for angling its carrying wheels, and means detachably connecting said control members to the arm extension on the tractor steering spindle.

In testimony whereof I affix my signature.

CHARLES PEARSON.